US011425620B1

(12) United States Patent
Marupaduga

(10) Patent No.: US 11,425,620 B1
(45) Date of Patent: Aug. 23, 2022

(54) DONOR SELECTION FOR 5G EN-DC CAPABLE RELAYS

(71) Applicant: Sprint Spectrum LP, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 16/939,273

(22) Filed: Jul. 27, 2020

(51) Int. Cl.
| | |
|---|---|
| *H04W 36/14* | (2009.01) |
| *H04W 40/22* | (2009.01) |
| *H04W 16/32* | (2009.01) |
| *H04W 88/04* | (2009.01) |
| *H04W 88/10* | (2009.01) |
| *H04W 84/04* | (2009.01) |

(52) U.S. Cl.
CPC .......... *H04W 36/14* (2013.01); *H04W 16/32* (2013.01); *H04W 40/22* (2013.01); *H04W 88/04* (2013.01); *H04W 84/047* (2013.01); *H04W 88/10* (2013.01)

(58) Field of Classification Search
CPC ............. H04W 4/80; H04W 76/00–16; H04W 88/00–10; H04W 12/009
See application file for complete search history.

(56) References Cited

U.S. PATENT DOCUMENTS

| | | | |
|---|---|---|---|
| 9,615,275 B2 | 4/2017 | Jamadagni et al. | |
| 2012/0314569 A1* | 12/2012 | Liu | H04W 28/08 370/230 |
| 2013/0012249 A1* | 1/2013 | Centonza | H04W 72/0426 455/501 |
| 2013/0279346 A1* | 10/2013 | Zhang | H04W 24/08 370/241.1 |
| 2014/0099881 A1* | 4/2014 | Boudreau | H04W 16/10 455/7 |
| 2015/0124616 A1* | 5/2015 | Lohman | H04L 43/0894 370/235 |
| 2016/0212775 A1* | 7/2016 | Xu | H04W 76/10 |

\* cited by examiner

*Primary Examiner* — San Htun

(57) ABSTRACT

Methods and systems for selecting donor access nodes for relay nodes capable of 5G EN-DC, based on conditions measured at a wireless backhaul between the relay nodes and donor access nodes, or a mobile backhaul between a cell site router and a core network. Mobile backhaul conditions can include a packet loss at a cell site router, and wireless backhaul conditions can include interference in a wireless air interface. The interference may be measured for specific portions of resources of the wireless air interface, and the specific portions may be correlated with radiofrequency (RF) channels deployed by each candidate donor access node.

16 Claims, 11 Drawing Sheets

DONOR SELECTION FOR 5G EN-DC CAPABLE RELAYS

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mm-wave) networks, as well as older legacy networks. In some cases, deployment of 5G new radio (NR) access nodes alongside or co-located with 4G long-term evolution (LTE) access nodes utilizes dual connectivity technology (e.g. EN-DC), wherein control information is transmitted using the 4G RAT and data is transmitted using the 5G RAT. There are various potential deployments of EN-DC, such as one-to-one (where a 4G eNodeB is colocated with a 5G gNodeB at the same cell site or radio access network), or one-to-many (where a 4G eNodeB at a first radio access network is coupled via X2 links to many different 5G gNodeBs, each within their own radio access network or cell site). Each radio access network (RAN) or cell site can further include a cell site router, which provides connectivity to other network elements, such as an intermediate or core network. The connection between the cell site router and other network elements closer to the core network may be referred to as a mobile backhaul.

Further, as wireless device technology improves, relay nodes are being deployed to improve service quality by relaying communication between an access node, and wireless devices in the wireless network. For example, relay nodes may be used at the edge of a coverage area of an access node to improve coverage and/or service, as well as in crowded areas having a high number of other wireless devices to increase the available throughput to the wireless devices being relayed. Relay nodes are generally configured to communicate with the serving access node (i.e. a "donor" access node) via a wireless connection, and to deploy a wireless air interface to which end-user wireless devices can attach. Relay nodes can include a combination of a relay wireless device physically coupled to a relay access point (AP). The relay wireless device provides the wireless connection between the AP and the donor access node, and such a wireless connection may be referred to as a wireless backhaul. Meanwhile the relay AP deploys the wireless air interface to which end-user wireless devices can attach. The relay wireless device can include a 5G-capable wireless device, thereby being able to avail of the aforementioned dual connectivity or EN-DC for a more robust wireless backhaul.

However, transitioning to these advanced technologies in today's heterogeneous wireless networks can be associated with problems. In particular, since relay nodes serve increasing numbers of wireless devices, it must be ensured that the relay nodes themselves are provided with a high quality wireless backhaul (wireless connection to a donor access node) as well as a high quality mobile backhaul (wired connection between the cell site router coupled to the donor access node and other network elements further upstream). Such considerations are further complicated in heterogeneous networks with various 5G and EN-DC deployments, particularly when a primary donor access node is a 4G eNodeB and a secondary donor access node is a 5G gNodeB, and the eNodeB is handling control transmissions while the gNodeB is handling data transmissions. Therefore, there is a need for appropriate selection of donor access nodes for a 5G relay node in heterogeneous networks.

Overview

Exemplary embodiments described herein include methods, systems, and processing nodes for selecting donor access nodes for relay nodes capable of 5G EN-DC, based on conditions measured at a wireless backhaul between the relay nodes and donor access nodes, or a mobile backhaul between a cell site router and a core network.

An exemplary method for selecting a donor access node includes identifying a relay node within range of one or more candidate donor access nodes, and selecting a donor access node for the relay node from the on one or more candidate donor access nodes based on one or more of a packet loss at a cell site router associated with each candidate donor access node or an interference in a wireless air interface deployed by each candidate donor access node. The interference may be measured for specific portions of resources of the wireless air interface, and the specific portions may be correlated with radiofrequency (RF) channels deployed by each candidate donor access node.

Another exemplary method for selecting a donor access node includes identifying one or more candidate donor access nodes for a relay node, obtaining one or both of a signal condition or a packet loss associated with each candidate donor access node, and selecting a donor access node for the relay node based on one or both of the signal condition or the packet loss. The packet loss associated with each candidate donor access node includes packet losses measured at a cell site router coupled to each candidate donor access node.

Another exemplary method for selecting a donor access node includes identifying candidate donor access nodes for a relay node, determining that two or more of the identified candidate donor access nodes are each coupled to a cell site router that has a packet loss below a threshold, and selecting a donor access node from among the two or more candidate donor access nodes based on a signal condition. The signal condition can include interference measured for specific portions of resources of the wireless air interface, and the specific portions may be correlated with radiofrequency (RF) channels deployed by each candidate donor access node.

Another exemplary method for selecting a donor access node includes identifying candidate donor access nodes for a relay node, determining that two or more of the identified candidate donor access nodes have signal conditions below a threshold, and selecting a donor access node from among the two or more candidate donor access nodes based on a packet loss. The signal condition can include interference measured for specific portions of resources of the wireless air interface, and the specific portions may be correlated with radiofrequency (RF) channels deployed by each candidate donor access node. Further, the packet loss associated with each candidate donor access node includes packet losses measured at a cell site router coupled to each candidate donor access node.

The exemplary embodiments described herein may be performed by a processing node within a system, such as a telecommunication system. For example, a processing node for selecting donor access nodes for relay nodes capable of 5G EN-DC, as described herein, may be configured to perform operations including identifying a relay node within range of one or more candidate donor access nodes, and selecting a donor access node for the relay node from the on one or more candidate donor access nodes based on one or more of a packet loss at a cell site router associated with each candidate donor access node or an interference in a wireless air interface deployed by each candidate donor access node. The interference may be measured for specific portions of resources of the wireless air interface, and the specific portions may be correlated with radiofrequency (RF) channels deployed by each candidate donor access node.

In another exemplary method, the processing node can be configured to perform operations including identifying one or more candidate donor access nodes for a relay node, obtaining one or both of a signal condition or a packet loss associated with each candidate donor access node, and selecting a donor access node for the relay node based on one or both of the signal condition or the packet loss. The packet loss associated with each candidate donor access node includes packet losses measured at a cell site router coupled to each candidate donor access node.

In another exemplary method, the processing node can be configured to perform operations including identifying candidate donor access nodes for a relay node, determining that two or more of the identified candidate donor access nodes are each coupled to a cell site router that has a packet loss below a threshold, and selecting a donor access node from among the two or more candidate donor access nodes based on a signal condition. The signal condition can include interference measured for specific portions of resources of the wireless air interface, and the specific portions may be correlated with radiofrequency (RF) channels deployed by each candidate donor access node.

In another exemplary method, the processing node can be configured to perform operations including identifying candidate donor access nodes for a relay node, determining that two or more of the identified candidate donor access nodes have signal conditions below a threshold, and selecting a donor access node from among the two or more candidate donor access nodes based on a packet loss. The signal condition can include interference measured for specific portions of resources of the wireless air interface, and the specific portions may be correlated with radiofrequency (RF) channels deployed by each candidate donor access node. Further, the packet loss associated with each candidate donor access node includes packet losses measured at a cell site router coupled to each candidate donor access node.

Further, systems described herein include processing nodes and other network entities configured to perform the disclosed operations. For example, an exemplary system for selecting a donor access node includes a primary access node configured to deploy a wireless air interface using a first RAT and one or more secondary access nodes configured to deploy wireless air interfaces using at least a second RAT. A processing node or a processor communicatively coupled to the primary access node can be configured to perform operations including identifying a relay node capable of attaching to at least the first and second RATs, and selecting a donor access node for the relay node from among the one or more secondary access nodes based on one or more of a signal condition or a packet loss.

DETAILED DESCRIPTION

Figure 1:
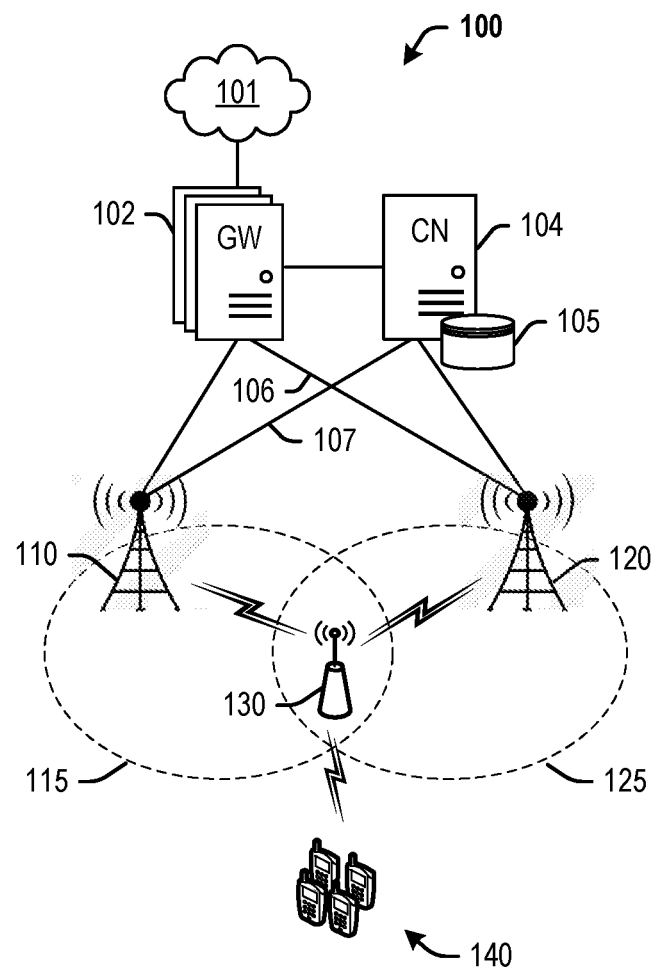
FIG. 1 depicts an exemplary system for selecting donor access nodes for relay nodes capable of 5G EN-DC.

The following disclosure provides methods and systems for selecting donor access nodes for relay nodes that are capable of utilizing 5G EN-DC, based on conditions at one or more of a backhaul connection of the relay nodes (i.e. a "wireless backhaul) or a backhaul connection of the donor access nodes (i.e. a "mobile backhaul"). For the wireless backhaul, the conditions can include interference metrics for specific physical resource blocks (PRBs) of the wireless backhaul as a criteria for selecting a donor access node. For the mobile backhaul, the conditions can include packet drops or losses at a cell site router of each potential or candidate donor access node to select the donor access node for the relay node. Each donor access node may be capable of communicating using a plurality of wireless air interfaces. For example, a donor access node can include a combination of a 4G eNodeB and a 5G gNodeB. In other words, the access node can be configured to communicate using 4G LTE as well using 5G NR. In some embodiments, the donor access node can include a 4G eNodeB coupled to a plurality of 5G gNodeBs (one-to-many configuration). In similar embodiments, the donor access nodes can be selected from either the eNodeB or one of the 5G gNodeBs. Thus, as further described herein, the donor access nodes can be part of the same or different cell sites or radio access networks (RANs), each RAN being served by a different cell site router.

Therefore, a method as described herein for selecting a donor access node for a relay node includes identifying a relay node within range of one or more candidate donor access nodes, and selecting a donor access node for the relay node from the on one or more candidate donor access nodes based on one or more of a packet loss at a cell site router associated with each candidate donor access node or an interference in a wireless air interface deployed by each candidate donor access node. The relay node is configured to relay traffic between the donor access node and one or more end-user wireless attached to the first one or more carriers. In an exemplary embodiment, the relay node comprises a relay wireless device communicatively coupled to a relay access point. The relay wireless device is configured to attach to a donor access node via the one or more carriers, and additional carriers are deployed by the relay access point. The relay node can be identified based on a unique identifier of the relay node, such as a public land mobile identifier (PLMN) of the relay node. The relay node can further be identified based on a quality of service class identifier (QCI) of a transmission associated with the relay node. Each candidate donor access node is capable of participating in dual-connectivity using at least one of a first radio access technology (RAT) and a second RAT, such as EN-DC using 4G LTE and 5G NR. Each candidate donor access node can include a primary access node configured to deploy carriers utilizing the first RAT, and may be coupled to one or more secondary access nodes configured to deploy carriers utilizing the second RAT. In one exemplary embodiment, the primary and secondary donor access nodes are both part of the same RAN and coupled to a single cell site router. In another exemplary embodiment, the primary donor access node (along with one or more secondary donor access nodes) may be coupled to a single cell site router on the same RAN, and may further be coupled to additional secondary donor access nodes on different RANs (and, therefore, coupled to different cell site routers.

The packet loss can be measured at a port of a cell site router coupled with each candidate donor access node. For the purposes of this disclosure, a candidate donor access node is one that is within range of a relay node, and may have a signal strength sufficient for the relay node to attach. Therefore, a donor access node can be selected from among the candidate donor access nodes based on the packet loss measured at the cell site router, and determining that the packet loss is below a threshold packet loss. In an exemplary embodiment, the packet loss is measured at a port of the cell site router that is associated with the specific RAT, e.g. 4G LTE, or 5G NR, depending on whether the candidate donor access node is a primary donor access node or a secondary donor access node. Different thresholds of packet loss may be defined for different types of RATs and donor access nodes. For example, the port of the cell site router that is associated with data transmissions (versus control transmissions) may be monitored for packet losses. In the event that a serving donor access node is a primary donor access node (e.g. a eNodeB), and a secondary donor access node is being identified for EN-DC purposes, the cell site router associated with one or more secondary access nodes (e.g. gNodeBs) may be monitored for packet losses. In an exemplary embodiment, the primary donor access node (e.g. eNodeB) can be responsible for the decision of which secondary donor access node (e.g. gNodeB) to select for EN-DC transmissions based on the packet losses of the cell site router associated with each secondary donor access node.

Similar to the selection of donor access nodes based on the packet losses, donor access nodes may be selected based on a signal condition of a wireless backhaul. For example, interference may be measured in portions of the wireless air interface available to the relay node. The portions can comprise physical resource blocks (PRBs), and interference determined in specific PRBs enables identification of different channels and, correspondingly, donor access nodes deploying the different channels. Thus, selecting the donor access node comprises identifying the portions of the wireless air interface in which interference is determined, and correlating the portions of the wireless air interface with a frequency band or channel associated with each candidate donor access node. Candidate donor access nodes not deploying the frequencies where interference is measured (or where the interference falls below a threshold) are chosen as donors. For example, a donor access node can be selected from among the candidate donor access nodes based on the measured interference of a channel (or specific PRBs associated therewith) being below a threshold. In an exemplary embodiment, the interference is measured for channels associated with a specific RAT, e.g. 4G LTE, or 5G NR, depending on whether the candidate donor access node is a primary donor access node or a secondary donor access node. Different thresholds of interference may be defined for different types of RATs and donor access nodes. In the event that a serving donor access node is a primary donor access node (e.g. a eNodeB), and a secondary donor access node is being identified for EN-DC purposes, the interference in PRBs (or channels) associated with one or more secondary access nodes (e.g. gNodeBs) may be monitored. In an exemplary embodiment, the primary donor access node (e.g. eNodeB) can be responsible for the decision of which secondary donor access node (e.g. gNodeB) to select for EN-DC transmissions based on the interference associated with each secondary donor access node.

As described herein, the selection of a donor access node for a 5G EN-DC capable relay node, from among a plurality of candidate donor access nodes, may be based on a combination of packet losses or drops at a cell site router and a per-PRB interference measured at the relay node. In one exemplary embodiment, candidate donor access nodes with below-threshold packet drops are identified, and then sorted according to per-PRB interference. In another exemplary embodiment, candidate donor access nodes with below-threshold per-PRB interference are identified, and then sorted according to packet drops at a cell site router associated with each candidate donor access node. Various other combinations of these operations may be envisioned by those having ordinary skill in the art in light of this disclosure.

In another exemplary embodiment, a method for selecting a donor access node for a relay node includes identifying one or more candidate donor access nodes for a relay node, obtaining one or both of a signal condition or a packet loss associated with each candidate donor access node, and selecting a donor access node for the relay node based on one or both of the signal condition or the packet loss. The relay node may be identified based on a unique identifier associated with the relay node, the unique identified comprising at least one of a public land mobile number (PLMN), a primary cell identifier (PCI), or a quality of service control identifier (QCI). Further, identifying the one or more candidate donor access nodes comprises determining that the one or more candidate donor access nodes are capable of participating in dual-connectivity using at least one of a first radio access technology (RAT) and a second RAT.

In an exemplary embodiment, each candidate donor access node comprises a primary access node configured to deploy carriers utilizing the first RAT, the primary access node is coupled to one or more secondary access nodes, each secondary access node configured to deploy carriers utilizing the second RAT. As described herein, the candidate donor access nodes can include primary donor access nodes (with respect to an EN-DC configuration) or secondary donor access nodes, and may be attached to the same or different cell site routers depending on the EN-DC configuration. Thus, the packet loss can be measured at a port of the cell site router that is associated with a first RAT (e.g. 4G LTE), or a port associated with a second RAT (e.g. 5G NR). In one exemplary embodiment, a packet loss associated with a first RAT may be compared with a first threshold, and a packet loss associated with a second RAT may be compared with a second threshold. Packet losses can be measured at different cell site routers and ports thereof, depending on how the candidate donor access nodes are configured. For example, the candidate donor access nodes may be selected from among a plurality of secondary access nodes configured to deploy carriers utilizing the second RAT, the secondary access nodes being coupled to a primary access node configured to deploy carriers utilizing the first RAT. Further, interference may be measured in portions of the wireless air interface deployed by each candidate donor access node or available to the relay node, thereby enabling identification of which candidate donor access nodes are subject to the least amount of interference.

These operations may be performed by an exemplary system described herein and comprising at least a processing node and a processor coupled to the processing node, and similar operations may be performed by a processing node communicatively coupled to any other network node within the wireless network. For example, a system for selecting a donor access node for a relay node includes a primary donor access node configured to deploy a wireless air interface using a first RAT, one or more secondary donor access nodes configured to deploy wireless air interfaces using at least a second RAT, and a processor coupled to the primary access node, the processor being configured to perform operations comprising identifying a relay node capable of attaching to at least the first and second RATs, and selecting a donor access node for the relay node from among the one or more secondary access nodes based on one or more of a signal condition or a packet loss. The packet loss can be measured at a cell site router coupled to each secondary donor access node. Each secondary donor associated with a different cell site router, and packet losses measured at a port of each cell site router that is associated with the second RAT, e.g. 5G NR. Further, interference can be measured in portions of the wireless air interface deployed by each donor access node, such as PRBs. The relay node can be instructed to attach to the primary donor access node via the first RAT, and to the secondary donor access node via the second RAT.

The packet drops at the cell site router are important for serving relay nodes that in turn serve numerous additional end-user wireless devices, particularly if the relay node and the end-user wireless devices are utilizing the higher bandwidths of 5G connections. The packet drops are particularly relevant for different ports of the cell site routers as further described below. In addition, the interference per PRB (as measured at the relay node) enables identification of specific channels that suffer from more or less interference, which further enables selection of a candidate donor access node using channels with less interference. This is particularly relevant in the one-to-many network configuration where different secondary gNodeBs serve different portions of a radiofrequency (RF) spectrum.

These and other embodiments are further described herein and with reference to FIGS. 1-12.

FIG. 1 depicts an exemplary system 100 comprising a communication network 101, gateway 102, controller node 104, access nodes 110, 120, relay node 130, and wireless devices 140. In this exemplary embodiment, access nodes 110, 120 may be macrocell access nodes configured to deploy wireless air interfaces to which relay node 130 (and other wireless devices not shown herein) can attach and access network services from network 101. Relay node 130 may be configured to communicate with access nodes 110, 120 over a communication link referred to as a wireless backhaul, and is further configured to deploy an additional wireless air-interface to which wireless devices 140 can attach. Relay node 130 is thus configured to relay data between a donor access node 110, 120 and wireless devices 140, such that wireless devices 140 may access network services using relay node 130, rather than overload donor access nodes 110, 120 which may be serving numerous other devices (not shown herein). Moreover, wireless devices that are outside a coverage area of access nodes 110, 120 may access network services from donor access nodes 110, 120 by virtue of being connected to relay node 130. Although only access nodes 110, 120, relay node 130, and end-user wireless devices 140 is illustrated in FIG. 1, system 100 can include various other combinations of carriers/wireless air interfaces, antenna elements, access nodes, and wireless devices, as may be evident to those having ordinary skill in the art in light of this disclosure.

Further, each of access nodes 110, 120 may be configured to deploy at least two wireless air interfaces using dual connectivity. For example, each access node 110, 120 can include a combination of an eNodeB and a gNodeB, such that each access node is be configured to deploy a wireless air interface using a first RAT (e.g. 4G LTE) and a second RAT (e.g. 5G NR). Each RAT can be configured to utilize a different frequency band or sub-band, a different channel size or bandwidth, and so on. For example, the 5G NR wireless air interface can be configured to utilize higher frequencies and larger channel bandwidths than the 4G LTE wireless air interface. Further, access nodes 110, 120 can be configured to communicate using both RATs at the same time. For example, dual connections can be set up with relay node 130 using both 4G and 5G wireless air interfaces, with the 4G wireless air interface being used to transmit control information, and the 5G wireless air interface being used to transmit data information. For example, a processing node within system 100 (for example, communicatively coupled to access nodes 110, 120, or any other network node) can be configured to determine whether or not relay node 130 is capable of dual connectivity, and instruct the access nodes 110, 120 to broadcast an indicator in, for example, a system information message. Responsive to the indicator, relay node 130 can attach to one of access nodes 110, 120 using the 4G wireless air interface to control and set up a dual connectivity session. In other words, control information (including SIB messages) is transmitted using the 4G LTE wireless air interface, while the 5G NR wireless air interface is utilized for transmission of data. Using the 5G RAT for data transmissions is advantageous, as 5G provides higher bandwidths and frequencies versus 4G.

In an exemplary embodiment, a processing node (communicably coupled to, for example, access nodes 110, 120) is configured to perform operations including identifying relay node 130 as being within range of candidate donor access nodes 110, 120, and selecting a donor access node for the relay node 130 based on one or more of a packet loss at a cell site router associated with each candidate donor access node 110, 120 or an interference in a wireless air interface deployed by each candidate donor access node 110, 120. The relay node 130 can be identified based on a unique identifier of the relay node, such as a public land mobile identifier (PLMN) of the relay node 130. The relay node 130 can further be identified based on a quality of service class identifier (QCI) of a transmission associated with the relay node 130. Further, the packet loss can be measured at a port of a cell site router (not shown herein) coupled with each candidate donor access node 110, 120, and a donor access node can be selected from among the candidate donor access nodes 110, 120 based on the packet loss being below a threshold packet loss. In an exemplary embodiment, the packet loss is measured at a port of the cell site router that is associated with the specific RAT, e.g. 4G LTE, or 5G NR, depending on whether the candidate donor access node 110, 120 is a primary donor access node or a secondary donor access node, as further described below and with reference to FIGS. 6-7. Further, donor access nodes may be selected based on a signal condition of a wireless backhaul of relay node 130. For example, interference may be measured in portions of the wireless air interface 114, 124 available to the relay node 130. The portions can comprise physical resource blocks (PRBs), and interference determined in specific PRBs enables identification of different channels and, correspondingly, donor access nodes deploying the different channels. Thus, selecting the donor access node 110, 120 comprises identifying the portions of the wireless air interface 114, 124 in which interference is determined, and correlating the portions of the wireless air interface 114, 124 with a frequency band or channel associated with each candidate donor access node 110, 120. Candidate donor access nodes not deploying the frequencies where interference is measured (or where the interference falls below a threshold) are chosen as donors for relay node 130. For example, a donor access node 110, 120 can be selected from among the candidate donor access nodes 110, 120 based on the measured interference of a channel (or specific PRBs associated therewith) being below a threshold.

Further, the selection of a donor access node 110, 120 for a 5G EN-DC capable relay node 130 may be based on a combination of packet losses or drops at a cell site router and a per-PRB interference measured at the relay node 130. In one exemplary embodiment, candidate donor access nodes with below-threshold packet drops are identified, and then sorted according to per-PRB interference. In another exemplary embodiment, candidate donor access nodes with below-threshold per-PRB interference are identified, and then sorted according to packet drops at a cell site router associated with each candidate donor access node. Various other combinations of these operations may be envisioned by those having ordinary skill in the art in light of this disclosure Access nodes 110, 120 can be any network node configured to provide communication between relay node 130 (and end-user wireless devices 140 attached thereto) and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area 115, 125 in the range of approximately five kilometers to thirty-five kilometers and an output power in the tens of watts. Alternatively, access nodes 110, 120 may comprise any short range, low power, small-cell access nodes such as a microcell access node, a picocell access node, a femtocell access node, or a home eNodeB/gNodeB device.

Access nodes 110, 120 can comprise a processor and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other, and other access nodes (not shown), using a wireless link or a wired link such as an X2 link. Components of exemplary access nodes 110, 120 and processing nodes coupled thereto are further described with reference to FIGS. 2-3.

Wireless device 140 may be any device, system, combination of devices, or other such communication platform capable of communicating wirelessly with access nodes 110, 120 using one or more frequency bands deployed therefrom. Wireless devices 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 140. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication links 106, 107 can be direct links or might include various equipment, intermediate components, systems, and networks, such as a cell site router, etc. Communication links 106, 107 may comprise many different signals sharing the same link. Communication links 106, 107 may be associated with many different reference points, such as N1-Nxx, as well as S1-Sxx, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW), a public data network gateway (PGW), and/or a systems architecture evolution gateway (SAE-GW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a control gateway (SGW-C or PGW-C), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as capabilities of access nodes 110, 120, and relay node 130, past or current trends of packet losses and signal conditions, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, gateway(s) 102, controller node 104, and/or network 101.

Figure 2:
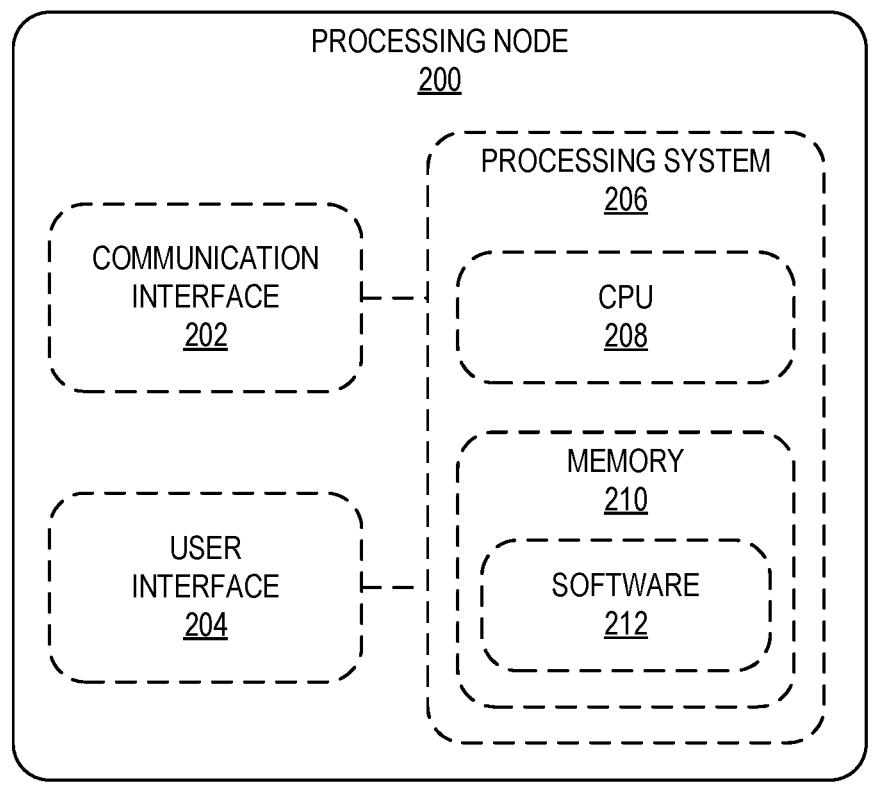
FIG. 2 depicts an exemplary processing node for selecting donor access nodes for relay nodes capable of 5G EN-DC.

FIG. 2 depicts an exemplary processing node 200. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Further, memory 210 can store a software 212, which may be executed to perform the operations described herein. In an exemplary embodiment, software 212 can include instructions for identifying a relay node within range of one or more candidate donor access nodes, and selecting a donor access node for the relay node from the on one or more candidate donor access nodes based on one or more of a packet loss at a cell site router associated with each candidate donor access node or an interference in a wireless air interface deployed by each candidate donor access node. The interference may be measured for specific portions of resources of the wireless air interface, and the specific portions may be correlated with radiofrequency (RF) channels deployed by each candidate donor access node. In another exemplary embodiment, software 212 can include instructions for identifying one or more candidate donor access nodes for a relay node, obtaining one or both of a signal condition or a packet loss associated with each candidate donor access node, and selecting a donor access node for the relay node based on one or both of the signal condition or the packet loss. The packet loss associated with each candidate donor access node includes packet losses measured at a cell site router coupled to each candidate donor access node. In another exemplary embodiment, software 212 can include instructions for identifying candidate donor access nodes for a relay node, determining that two or more of the identified candidate donor access nodes are each coupled to a cell site router that has a packet loss below a threshold, and selecting a donor access node from among the two or more candidate donor access nodes based on a signal condition. The signal condition can include interference measured for specific portions of resources of the wireless air interface, and the specific portions may be correlated with radiofrequency (RF) channels deployed by each candidate donor access node. In another exemplary embodiment, software 212 can include instructions for identifying candidate donor access nodes for a relay node, determining that two or more of the identified candidate donor access nodes have signal conditions below a threshold, and selecting a donor access node from among the two or more candidate donor access nodes based on a packet loss. The signal condition can include interference measured for specific portions of resources of the wireless air interface, and the specific portions may be correlated with radiofrequency (RF) channels deployed by each candidate donor access node. Further, the packet loss associated with each candidate donor access node includes packet losses measured at a cell site router coupled to each candidate donor access node.

Figure 3:
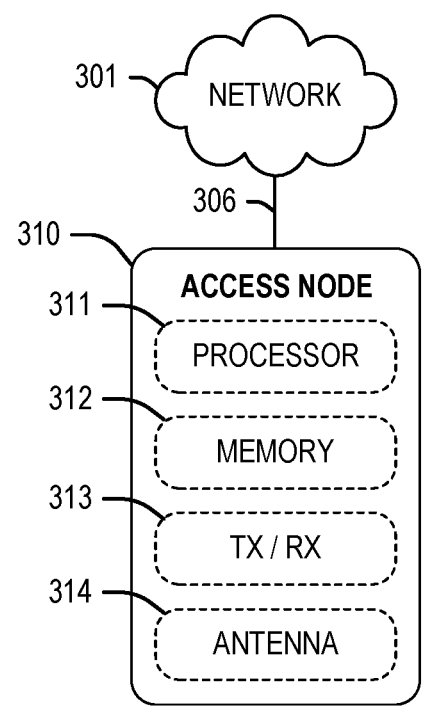
FIG. 3 depicts an exemplary access node.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, a transceiver 313, and antennae 314 (hereinafter referred to as antenna elements 314). Processor 311 executes instructions stored on memory 312, and transceiver 313 (in conjunction with antenna elements 314) enable wireless communication respectively at least two wireless air interfaces, such as 4G LTE and 5G NR. For example, access node 310 may be configured to transmit control information using a first set of antennae elements 314 configured to utilize a 4G LTE interface, and data information using a second set of antennae elements 314 configured to utilize a 5G NR air interface. Alternatively or in addition, each separate air interface maintains its own control and data transmissions. Further, antenna elements 314 may include an array of antenna elements that are configured to deploy air interfaces over one or more wireless sectors, form beams within these sectors, employ multiple-input-multiple-output (MIMO), etc.

In an exemplary embodiment, memory 312 can store instructions for identifying a relay node within range of one or more candidate donor access nodes, and selecting a donor access node for the relay node from the on one or more candidate donor access nodes based on one or more of a packet loss at a cell site router associated with each candidate donor access node or an interference in a wireless air interface deployed by each candidate donor access node. The interference may be measured for specific portions of resources of the wireless air interface, and the specific portions may be correlated with radiofrequency (RF) channels deployed by each candidate donor access node. In another exemplary embodiment, memory 312 can store instructions for identifying one or more candidate donor access nodes for a relay node, obtaining one or both of a signal condition or a packet loss associated with each candidate donor access node, and selecting a donor access node for the relay node based on one or both of the signal condition or the packet loss. The packet loss associated with each candidate donor access node includes packet losses measured at a cell site router coupled to each candidate donor access node. In another exemplary embodiment, memory 312 can store instructions for identifying candidate donor access nodes for a relay node, determining that two or more of the identified candidate donor access nodes are each coupled to a cell site router that has a packet loss below a threshold, and selecting a donor access node from among the two or more candidate donor access nodes based on a signal condition. The signal condition can include interference measured for specific portions of resources of the wireless air interface, and the specific portions may be correlated with radiofrequency (RF) channels deployed by each candidate donor access node. In another exemplary embodiment, memory 312 can store instructions for identifying candidate donor access nodes for a relay node, determining that two or more of the identified candidate donor access nodes have signal conditions below a threshold, and selecting a donor access node from among the two or more candidate donor access nodes based on a packet loss. The signal condition can include interference measured for specific portions of resources of the wireless air interface, and the specific portions may be correlated with radiofrequency (RF) channels deployed by each candidate donor access node. Further, the packet loss associated with each candidate donor access node includes packet losses measured at a cell site router coupled to each candidate donor access node.

Figure 4:
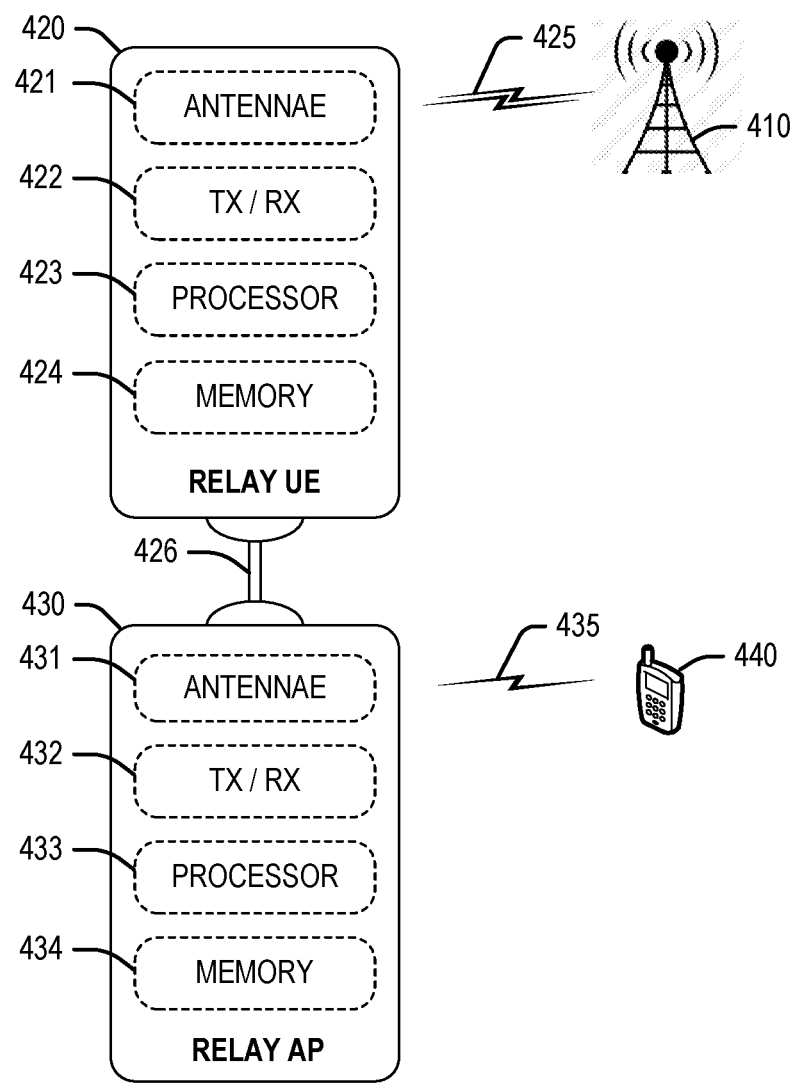
FIG. 4 depicts an exemplary relay node capable of 5G EN-DC

FIG. 4 depicts an exemplary relay node comprising a relay wireless device (UE) 420 and a relay access point (AP) 430. Relay wireless device 420 is illustrated as comprising an antenna 421 for direct (i.e. unrelayed) communication with donor access node 410 via wireless backhaul link 425, a transceiver 422, a processor 423, and a memory 424 for storing instructions that enable relay wireless device 420 to perform operations described herein. In some embodiments, relay wireless device 420 is referred to as a customer premise equipment (CPE), which includes any stationary LTE wireless device having a stronger computational & RF capability versus standard wireless devices, as well as a directional antenna and a dedicated power supply, enabling relay wireless device 420 to efficiently provide resources to wireless device 440 via relay access point 430. Consequently, relay access point 430 may be co-located with relay wireless device 420, and is connected to relay wireless device 420 via a communication interface 426. Communication interface 426 may be any interface that enables direct communication between relay wireless device 420 and relay access point 430, such as USB, FireWire, Ethernet, or any other serial, parallel, analog, or digital interface. Transceivers 422 can include transceivers capable of dual connectivity. For example, transceivers 422 can include a combination of transceivers capable of communicating via 4G LTE and 5G NR simultaneously. Antennae 421 can be similarly enabled for 5G EN-DC transmissions.

In operation, relay wireless device 420 may be configured to relay network services from donor access node 410 to wireless device 440 via relay access point 430. Relay wireless device 420 may begin to function as a relay wireless device by sending a message to donor access node 410 to indicate to donor access node 410 that wireless device 420 is functioning as a relay wireless device. In some embodiments, relay wireless device 420 can request to send a buffer status report to donor access node 410. Donor access node 410 can grant this request in a conventional manner. Relay wireless device 420 may respond to the grant by sending a short buffer status report. This short buffer status report is associated with a logical channel group that indicates the buffer status report is communicating the status of relay wireless device 420 as a relay, and thus is not asking for additional resource allocations (like a 'conventional' buffer status report would indicate). In other words, when relay wireless device 420 responds with a buffer status report for the 'special' logical channel group, it means that the buffer status report is not actually reporting the status of a buffer. Rather, this buffer status report indicates that the wireless device is now functioning as a relay. Once status of relay wireless device 420 is established, relay wireless device 420 may instruct relay access point 430 to start accepting connection requests from one or more wireless devices such as wireless device 440. Further, based on the indication of relay status, donor access node 410 may alter how relay wireless device 420 is treated. For example, relay wireless device 420 may be provided with preferential treatment because it is functioning as a relay. Further, memory 424 can include instructions for transmitting an identifier of relay UE 420 to donor access node 410, such as a PLMN ID, enabling donor access node 410 to perform the donor selection operations described herein for 5G EN-DC capable relay nodes.

Relay access point 430 is illustrated as comprising an antenna 431 and transceiver 432 for enabling communication with wireless device 440, processor 433, and a memory 434 for storing instructions that are executed by processor 433. In some embodiments, relay access point 430 may be a home eNodeB. Moreover, although only one transceiver is depicted in each of relay wireless device 420 and relay access point 430, additional transceivers may be incorporated in order to facilitate communication across interface 426 and other network elements.

Figure 5:
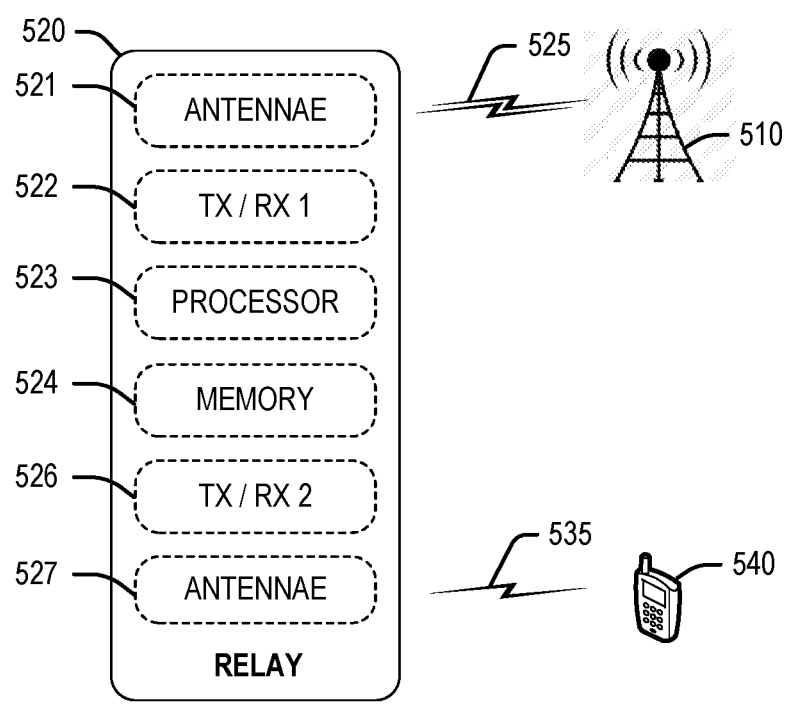
FIG. 5 depicts another exemplary relay node capable of 5G EN-DC

In another exemplary embodiment, the relay node may integrate components of a relay wireless device and a relay access point into a single unit. FIG. 5 depicts such an exemplary relay node 520. Relay node 520 is illustrated as comprising an antenna 521 for direct (i.e. unrelayed) communication with donor access node 510 via wireless backhaul link 525, a transceiver 522, a processor 523, and a memory 524 for storing instructions that are executed by processor 522 as described herein. Relay node 520 further includes another transceiver 526 and antenna 527 for enabling communication with wireless device 540. Relay node 520 can perform operations similar to those described with respect to FIG. 4.

In an embodiment, the relay nodes depicted in FIG. 4-5 can be configured to function as one or more of a layer 1 (L1), layer 2 (L2), or layer 3 (L3) relay. A layer 1 relay functions as a booster or repeater. In other words, a layer 1 relay node performs an amplify and forward (AF) function. RF signals received from a donor access node are amplified and transmitted to wireless devices. Likewise, RF signals received from wireless devices are amplified and transmitted to donor access nodes. Alternatively or in addition, a layer 2 relay node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively or in addition, a layer 3 relay node also performs a decode and forward function. However, a layer 3 relay node also performs additional processing (such as ciphering and/or data concatenation/segmentation/resassembly). In other words, relay node depicted herein performs demodulation and decoding of the received RF signals (either uplink or downlink), processes received data, then encodes, modulates, and transmits the data to a wireless device.

Figure 6:
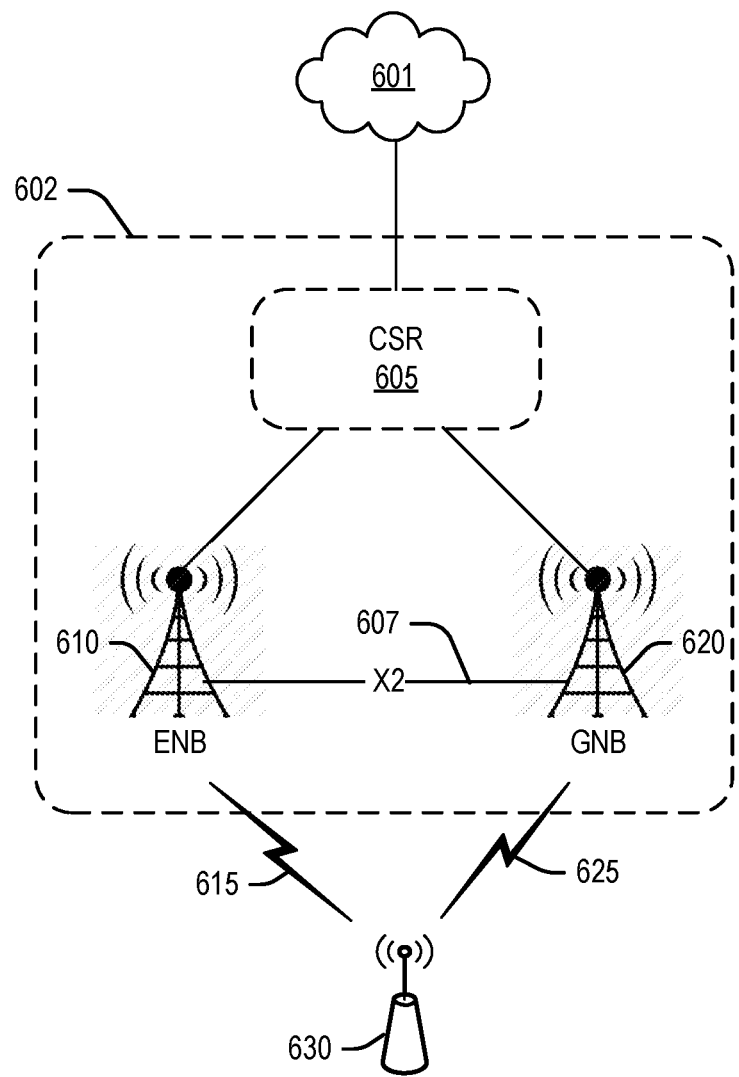
FIG. 6 depicts an exemplary 5G EN-DC radio access network.

FIG. 6 depicts an exemplary 5G EN-DC radio access network (RAN) 602. RAN 602 includes at least a cell site router 605, and access nodes 610, 620. Cell site router 605 can include any network node that is configured to route incoming data packets from network 601 to relay node 630 via access node(s) 610, 620, and to route outgoing data packets received from the relay node 630 via access node(s) 610, 620 to the network 601. Therefore, network 601 can include any combination of networks, including a core network, intermediate/backhaul network, or packet data network (PDN). Persons having ordinary skill in the art may note that although only access nodes 610, 620, cell site router 605, and network 601 are illustrated in FIG. 6, other components such as gateways, controller nodes, user plane functions, etc. may be included as well.

In this exemplary embodiment, access node 610 can include a eNodeB, and access node 620 can include a gNodeB. For example, access node 610 can be configured to deploy a wireless interface 615 using a first radio access technology (RAT), e.g. 4G LTE, and access node 620 can be configured to deploy a second wireless interface 625 using a second RAT, e.g. 5G NR. Each RAT can be configured to utilize a different frequency band or sub-band, a different channel size or bandwidth, and so on. For example, the 5G NR wireless interface 625 can be configured to utilize higher frequencies and larger channel bandwidths than the 4G LTE wireless interface 615. Further, access nodes 610, 620 can be configured to communicate using both RATs at the same time. For example, dual connections can be set up with relay node 630 using both 4G and 5G air interfaces 615, 625 respectively, the 4G wireless interface 615 being used to transmit control information, and the 5G wireless interface 625 being used to transmit data information. For example, a processing node within system 600 (for example, communicatively coupled to access nodes 610, 620, or any other network node) can be configured to determine whether or not relay node 630 is capable of communicating using both RATs (e.g. capable of 5G EN-DC), and instruct the access node 610 to broadcast an indicator in, for example, a system information message. Responsive to the indicator, relay node 630 can attach to access node 610 which can use the 4G carrier to control and set up a dual connectivity session with relay node 630. In other words, control information (including SIB messages) is transmitted from the access node 610 using the 4G LTE air interface, while the 5G NR air interface is utilized for transmission of data. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth.

Further, within radio access network 602, access nodes 610 and 620 can be coupled via a direct communication link 607, which can include an X2 communication link. Access nodes 610 and 620 can communicate control and data information across X2 communication link 607. In an exemplary embodiment, access node 620 includes logic to determine how to allocate data packets between access node 610 and access node 620, wherein the data packets flow between relay node 630 and a network node on network 601 via cell site router 605. Such logic may include a packet data convergence protocol (PDCP) function. Thus, RAN 602 can include a plurality of antenna elements (not shown herein)

coupled to access nodes 610 and 620, with different antenna elements configured to deploy a different radio air interface using a different frequency.

Cell site router 605 is illustrated as being coupled to both access nodes 610, 620 and capable of communicating with network 601. Cell site router 605 can include any node that is configured to route data packets between network 601 and access nodes 610, 620, via one or more ports of cell site router 605. For example, in addition to a processor and a memory, cell site router 605 can include 4G ports and 5G ports which are used to transport data packets that are associated with 4G and/or 5G RATs. In addition, the memory stores at least a 4G buffer and a 5G buffer, respectively associated with the 4G port and the 5G port. Further, cell site router 605 (or a processing node communicatively coupled thereto) is configured to determine a packet loss associated with a data transmission between a source node and a destination node. The source node may be any of end-user wireless devices attached to relay node 630, and the destination node can be any node associated with network 601, such that the cell site router 605 is configured to receive a data transmission from one of access nodes 610, 620, and forward the data transmission to the destination node (via the network 601 and/or any intervening gateway nodes). In other words, the data transmission may be an uplink data transmission. Alternatively or in addition, the source node is any network node associated with network 601, the destination node is an end-user wireless device attached to the relay node 630, and the cell site router 605 is configured to receive the data transmission from the source node and transmit the data transmission to the end-user wireless device via the access node 610, 620. In other words, the data transmission can be a downlink data transmission.

For at least the reasons discussed above, dropped packets occurring at cell site routers can negatively impact an overall throughput and quality of service for end-user wireless devices, particularly when the end-user wireless devices are communication via a single relay node (such as relay node 630). Further, a signal condition of wireless air interfaces 615, 625 can affect performance of end-user wireless devices attached to relay node 630. Thus, a processing node within RAN 602 can be configured to perform operations including identifying relay node 630 as being within range of candidate donor access nodes 610, 620, and selecting a donor access node for the relay node 630 based on one or more of a packet loss at a cell site router associated with each candidate donor access node 610, 620 or an interference in a wireless air interface deployed by each candidate donor access node 610, 620. The relay node 630 can be identified based on a unique identifier of the relay node, such as a public land mobile identifier (PLMN) of the relay node 630. The relay node 630 can further be identified based on a quality of service class identifier (QCI) of a transmission associated with the relay node 630. Further, the packet loss can be measured at a port of cell site router 605, and a donor access node can be selected from among the candidate donor access nodes 610, 620 based on the packet loss being below a threshold packet loss. In an exemplary embodiment, the packet loss is measured at a port of the cell site router 605 that is associated with a specific RAT, e.g. 4G LTE, or 5G NR, depending on whether the candidate donor access node 610, 620 is a primary donor access node or a secondary donor access node, as further described below and with reference to FIGS. 6-7. Further, donor access nodes may be selected based on a signal condition of a wireless backhaul of relay node 630. For example, interference may be measured in portions of the wireless air interface 615, 625 available to the relay node 130. The portions can comprise physical resource blocks (PRBs), and interference determined in specific PRBs enables identification of different channels and, correspondingly, donor access nodes deploying the different channels. Thus, selecting the donor access node 610, 620 comprises identifying the portions of the wireless air interface 615, 625 in which interference is determined, and correlating the portions of the wireless air interface 615, 625 with a frequency band or channel associated with each candidate donor access node 610, 620. Candidate donor access nodes not deploying the frequencies where interference is measured (or where the interference falls below a threshold) are chosen as donors for relay node 630.

Figure 7:
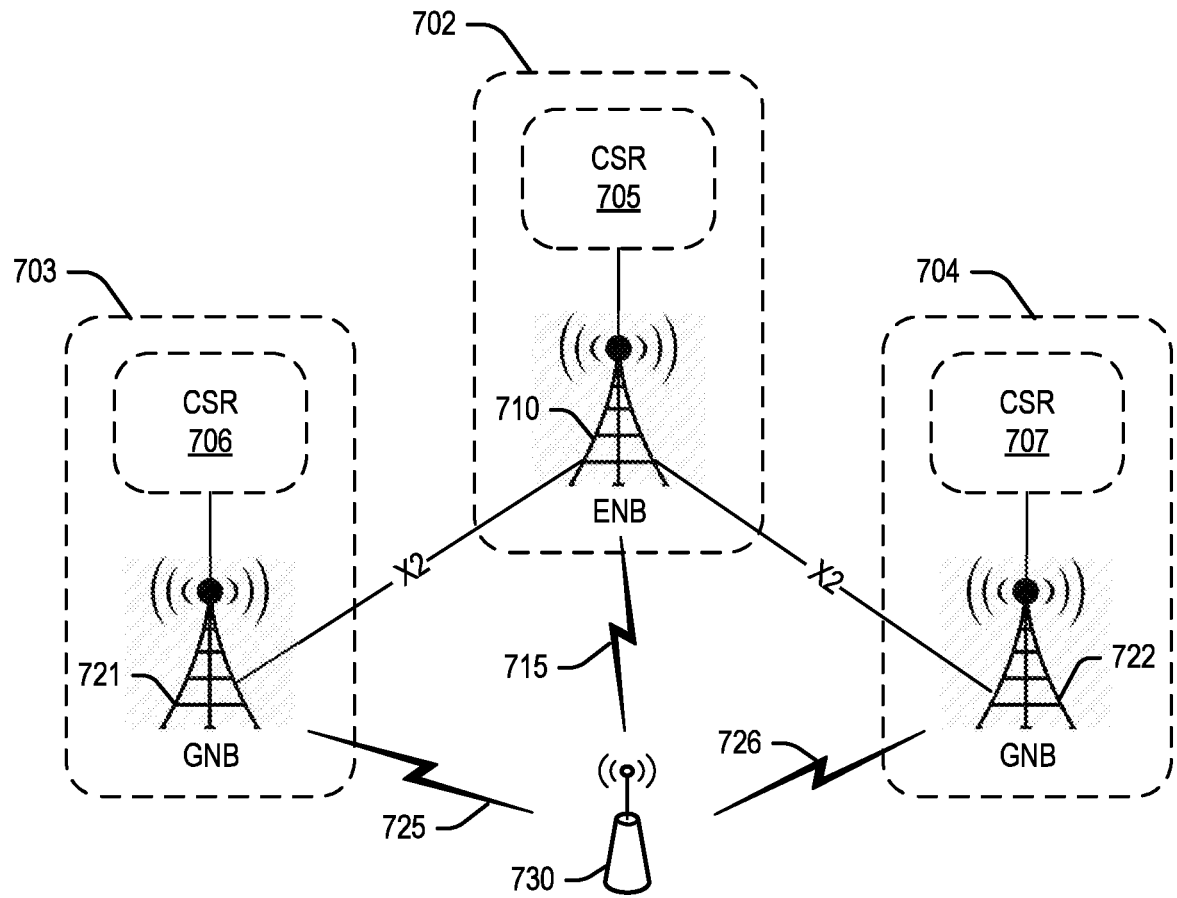
FIG. 7 depicts donor selection in another exemplary 5G EN-DC radio access network.

FIG. 7 depicts donor selection in another exemplary 5G EN-DC radio access network. Each of RANs 702, 703, 704 includes at least a cell site router 705, 706, 707, and access nodes 710, 721, 722. This embodiment depicts a one-to-many configuration, in which an eNodeB 710 is designated as a primary donor access node for relay node 730, and one or more gNodeBs 721, 722 are selected as secondary donor access nodes, as further described below. Cell site routers 705, 706, 707 function in a manner similar to cell site router 605 in FIG. 6. Persons having ordinary skill in the art may note that although only access nodes 710, 721, 722 and cell site routers 705, 706, and 707 are illustrated in RANs 702, 703, 704 respectively, other components may be included in any combination.

In this exemplary embodiment, access node 710 can include a eNodeB, and access nodes 721, 722 can include gNodeBs. For example, access node 710 can be configured to deploy a wireless interface 715 using a first radio access technology (RAT), e.g. 4G LTE, and access nodes 721, 722 can be configured to deploy second and third wireless interfaces 725, 726 using a second RAT, e.g. 5G NR. Further, access nodes 710, 721, 722 can be configured to communicate using both RATs at the same time. For example, dual connections can be set up with relay node 730 using both 4G and 5G air interfaces respectively, the 4G wireless interface 715 being used to transmit control information, and one of the 5G wireless interfaces 725, 726 being used to transmit data information. For example, a processing node communicatively coupled to access node 710 can be configured to determine whether or not relay node 730 is capable of communicating using both RATs (e.g. capable of 5G EN-DC), and instruct the access node 710 to broadcast an indicator in, for example, a system information message. Responsive to the indicator, relay node 730 can attach to access node 710 which can use the 4G carrier to control and set up a dual connectivity session with relay node 730. Further, access node 710 can be configured to select one (or more) of access nodes 721, 722 as a secondary donor access node, to transport user data. In other words, control information (including SIB messages) is transmitted from the access node 710 using the 4G LTE air interface, while the 5G NR air interfaces 725, 726 are utilized for transmission of data. Further, access nodes 721 and 722 (hereinafter "secondary donor access nodes") can each be coupled to access node 710 (hereinafter "primary donor access node") via X2 communication links. In an exemplary embodiment, each secondary donor access node 721, 722 can include logic to determine how to allocate data packets between the donor access nodes, wherein the data packets flow between relay node 730 and a network node not shown herein. Such logic may include a packet data convergence protocol (PDCP) function.

Further, a processing node communicatively coupled to at least access node 710 can be configured to perform operations including identifying relay node 730 as being within range of candidate secondary donor access nodes 721, 722, and selecting a secondary donor access node for the relay node 730 based on one or more of a packet loss at each cell site router 706, 707, or an interference in wireless air interfaces 725, 726. The relay node 730 can be identified based on a unique identifier of the relay node, such as a public land mobile identifier (PLMN) of the relay node 730. The relay node 730 can further be identified based on a quality of service class identifier (QCI) of a transmission associated with the relay node 730. Further, the packet loss can be measured at a port of cell site routers 706, 706, and a secondary donor access node can be selected from among the candidate secondary donor access nodes 721, 722 based on the packet loss being below a threshold packet loss. In an exemplary embodiment, the packet loss is measured at a port of each cell site router 706, 707 that is associated with the 5G NR RAT, since the candidate donor access nodes are secondary donor access nodes 721, 722. Further, donor access nodes may be selected based on a signal condition of a wireless backhaul on each wireless air interface 725, 726. The portions can comprise physical resource blocks (PRBs), and interference determined in specific PRBs enables identification of different channels and, correspondingly, secondary donor access nodes 721, 722 deploying the different channels. Thus, selecting the secondary donor access node comprises identifying the portions of the wireless air interface 725, 726 in which interference is determined, and correlating the portions of the wireless air interface 725, 726 with a frequency band or channel associated with each candidate secondary donor access node 721, 722. Candidate donor access nodes not deploying the frequencies where interference is measured (or where the interference falls below a threshold) are chosen as donors for relay node 730.

Figure 8:
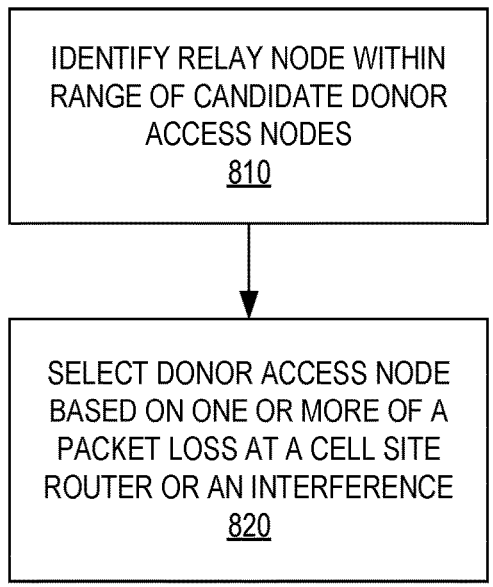
FIG. 8 depicts an exemplary method for selecting donor access nodes for relay nodes capable of 5G EN-DC.

FIG. 8 depicts an exemplary method for selecting donor access nodes for relay nodes capable of 5G EN-DC. The method of FIG. 8 may be implemented by a processing node communicatively coupled to one or more access nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, a relay node is identified as being within range of one or more candidate donor access nodes. The relay node is configured to relay traffic between the donor access node and one or more end-user wireless attached to the first one or more carriers. In an exemplary embodiment, the relay node comprises a relay wireless device communicatively coupled to a relay access point. The relay wireless device is configured to attach to a donor access node via the one or more carriers, and additional carriers are deployed by the relay access point. The relay node can be identified based on a unique identifier of the relay node, such as a public land mobile identifier (PLMN) of the relay node. The relay node can further be identified based on a quality of service class identifier (QCI) of a transmission associated with the relay node.

At 820, a donor access node is selected for the relay node from the on one or more candidate donor access nodes based on one or more of a packet loss at a cell site router associated with each candidate donor access node or an interference in a wireless air interface deployed by each candidate donor access node. Each candidate donor access node is capable of participating in dual-connectivity using at least one of a first radio access technology (RAT) and a second RAT, such as EN-DC using 4G LTE and 5G NR. Each candidate donor access node can include a primary access node configured to deploy carriers utilizing the first RAT, and may be coupled to one or more secondary access nodes configured to deploy carriers utilizing the second RAT. In one exemplary embodiment, the primary and secondary donor access nodes are both part of the same RAN and coupled to a single cell site router. In another exemplary embodiment, the primary donor access node (along with one or more secondary donor access nodes) may be coupled to a single cell site router on the same RAN, and may further be coupled to additional secondary donor access nodes on different RANs (and, therefore, coupled to different cell site routers).

The packet loss can be measured at a port of a cell site router coupled with each candidate donor access node. For the purposes of this disclosure, a candidate donor access node is one that is within range of a relay node, and may have a signal strength sufficient for the relay node to attach. Therefore, a donor access node can be selected from among the candidate donor access nodes based on the packet loss measured at the cell site router, and determining that the packet loss is below a threshold packet loss. In an exemplary embodiment, the packet loss is measured at a port of the cell site router that is associated with the specific RAT, e.g. 4G LTE, or 5G NR, depending on whether the candidate donor access node is a primary donor access node or a secondary donor access node. Different thresholds of packet loss may be defined for different types of RATs and donor access nodes. For example, the port of the cell site router that is associated with data transmissions (versus control transmissions) may be monitored for packet losses. In the event that a serving donor access node is a primary donor access node (e.g. a eNodeB), and a secondary donor access node is being identified for EN-DC purposes, the cell site router associated with one or more secondary access nodes (e.g. gNodeBs) may be monitored for packet losses. In an exemplary embodiment, the primary donor access node (e.g. eNodeB) can be responsible for the decision of which secondary donor access node (e.g. gNodeB) to select for EN-DC transmissions based on the packet losses of the cell site router associated with each secondary donor access node.

Similar to the selection of donor access nodes based on the packet losses, donor access nodes may be selected based on a signal condition of a wireless backhaul. For example, interference may be measured in portions of the wireless air interface available to the relay node. The portions can comprise physical resource blocks (PRBs), and interference determined in specific PRBs enables identification of different channels and, correspondingly, donor access nodes deploying the different channels. Thus, selecting the donor access node comprises identifying the portions of the wireless air interface in which interference is determined, and correlating the portions of the wireless air interface with a frequency band or channel associated with each candidate donor access node. Candidate donor access nodes not deploying the frequencies where interference is measured (or where the interference falls below a threshold) are chosen as donors. For example, a donor access node can be selected from among the candidate donor access nodes based on the measured interference of a channel (or specific PRBs associated therewith) being below a threshold. In an exemplary embodiment, the interference is measured for channels associated with a specific RAT, e.g. 4G LTE, or 5G NR, depending on whether the candidate donor access node is a primary donor access node or a secondary donor access node. Different thresholds of interference may be defined for different types of RATs and donor access nodes. In the event that a serving donor access node is a primary donor access node (e.g. a eNodeB), and a secondary donor access node is being identified for EN-DC purposes, the interference in PRBs (or channels) associated with one or more secondary access nodes (e.g. gNodeBs) may be monitored. In an exemplary embodiment, the primary donor access node (e.g. eNodeB) can be responsible for the decision of which secondary donor access node (e.g. gNodeB) to select for EN-DC transmissions based on the interference associated with each secondary donor access node.

Figure 9:
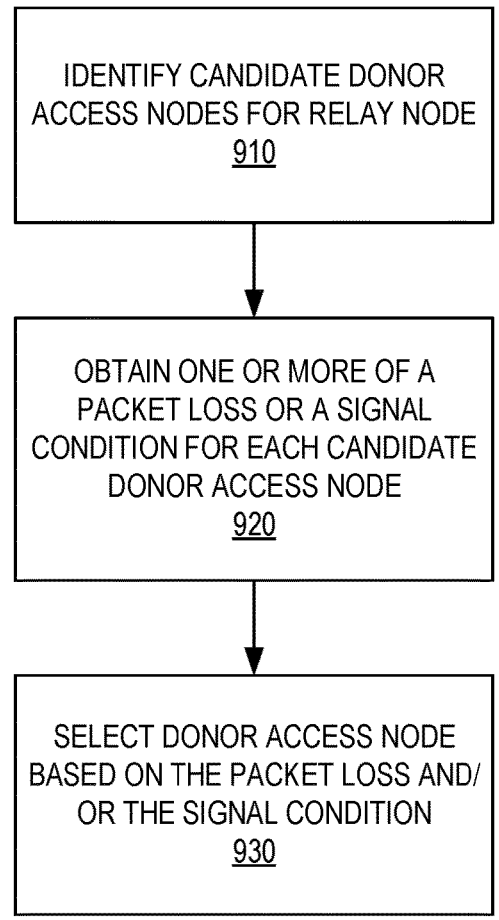
FIG. 9 depicts an exemplary method for selecting donor access nodes for relay nodes capable of 5G EN-DC.

FIG. 9 depicts an exemplary method for selecting donor access nodes for relay nodes capable of 5G EN-DC. The method of FIG. 9 may be implemented by a processing node communicatively coupled to one or more access nodes, controller nodes, or any other network node. Although FIG. 9 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 910, candidate donor access nodes are identified for a relay node. Each candidate donor access node is capable of participating in dual-connectivity using at least one of a first radio access technology (RAT) and a second RAT, such as EN-DC using 4G LTE and 5G NR. Each candidate donor access node can include a primary access node configured to deploy carriers utilizing the first RAT, and may be coupled to one or more secondary access nodes configured to deploy carriers utilizing the second RAT. In one exemplary embodiment, the primary and secondary donor access nodes are both part of the same RAN and coupled to a single cell site router. In another exemplary embodiment, the primary donor access node (along with one or more secondary donor access nodes) may be coupled to a single cell site router on the same RAN, and may further be coupled to additional secondary donor access nodes on different RANs (and, therefore, coupled to different cell site routers.

At 920, packet losses and/or signal conditions are obtained for each candidate donor access node and, at 930, a donor access node is selected based on the packet losses and signal conditions. The packet loss can be measured at a port of a cell site router coupled with each candidate donor access node. For the purposes of this disclosure, a candidate donor access node is one that is within range of a relay node, and may have a signal strength sufficient for the relay node to attach. Therefore, a donor access node can be selected from among the candidate donor access nodes based on the packet loss measured at the cell site router, and determining that the packet loss is below a threshold packet loss. In an exemplary embodiment, the packet loss is measured at a port of the cell site router that is associated with the specific RAT, e.g. 4G LTE, or 5G NR, depending on whether the candidate donor access node is a primary donor access node or a secondary donor access node. Different thresholds of packet loss may be defined for different types of RATs and donor access nodes. For example, the port of the cell site router that is associated with data transmissions (versus control transmissions) may be monitored for packet losses. In the event that a serving donor access node is a primary donor access node (e.g. a eNodeB), and a secondary donor access node is being identified for EN-DC purposes, the cell site router associated with one or more secondary access nodes (e.g. gNodeBs) may be monitored for packet losses. In an exemplary embodiment, the primary donor access node (e.g. eNodeB) can be responsible for the decision of which secondary donor access node (e.g. gNodeB) to select for EN-DC transmissions based on the packet losses of the cell site router associated with each secondary donor access node.

Similar to the selection of donor access nodes based on the packet losses, donor access nodes may be selected based on a signal condition of a wireless backhaul. For example, interference may be measured in portions of the wireless air interface available to the relay node. The portions can comprise physical resource blocks (PRBs), and interference determined in specific PRBs enables identification of different channels and, correspondingly, donor access nodes deploying the different channels. Thus, selecting the donor access node comprises identifying the portions of the wireless air interface in which interference is determined, and correlating the portions of the wireless air interface with a frequency band or channel associated with each candidate donor access node. Candidate donor access nodes not deploying the frequencies where interference is measured (or where the interference falls below a threshold) are chosen as donors. For example, a donor access node can be selected from among the candidate donor access nodes based on the measured interference of a channel (or specific PRBs associated therewith) being below a threshold. In an exemplary embodiment, the interference is measured for channels associated with a specific RAT, e.g. 4G LTE, or 5G NR, depending on whether the candidate donor access node is a primary donor access node or a secondary donor access node. Different thresholds of interference may be defined for different types of RATs and donor access nodes. In the event that a serving donor access node is a primary donor access node (e.g. a eNodeB), and a secondary donor access node is being identified for EN-DC purposes, the interference in PRBs (or channels) associated with one or more secondary access nodes (e.g. gNodeBs) may be monitored. In an exemplary embodiment, the primary donor access node (e.g. eNodeB) can be responsible for the decision of which secondary donor access node (e.g. gNodeB) to select for EN-DC transmissions based on the interference associated with each secondary donor access node.

Figure 10:
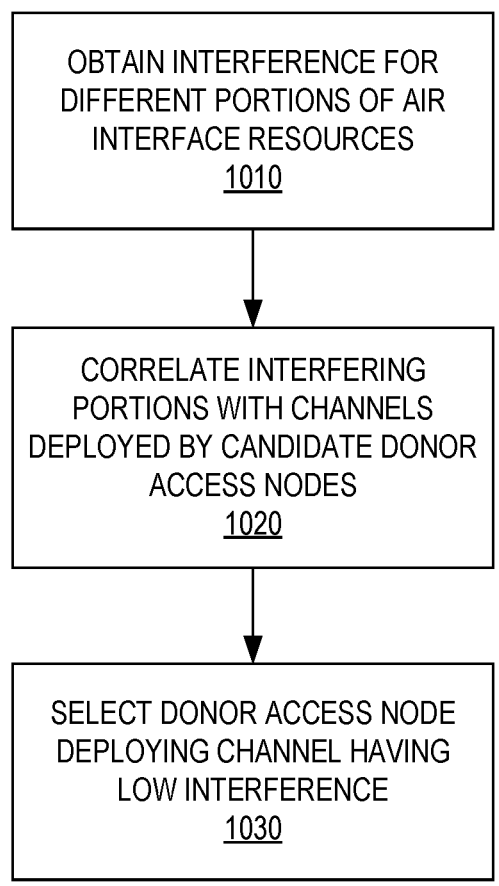
FIG. 10 depicts an exemplary method for selecting donor access nodes for relay nodes capable of 5G EN-DC.

FIG. 10 depicts an exemplary method for selecting donor access nodes for relay nodes capable of 5G EN-DC. The method of FIG. 10 may be implemented by a processing node communicatively coupled to one or more access nodes, controller nodes, or any other network node. Although FIG. 10 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 1010, interference is obtained for different portions of air interface resources that are available to a relay node. The relay node is configured to relay traffic between the donor access node and one or more end-user wireless attached to the first one or more carriers. In an exemplary embodiment, the relay node comprises a relay wireless device communicatively coupled to a relay access point. the relay wireless device is configured to attach to a donor access node via the one or more carriers, and additional carriers are deployed by the relay access point. The relay node can be identified based on a unique identifier of the relay node, such as a public land mobile identifier (PLMN) of the relay node. The relay node can further be identified based on a quality of service class identifier (QCI) of a transmission associated with the relay node.

At 1020, interfering portions are correlated with channels deployed by different candidate donor access nodes. The portions can comprise physical resource blocks (PRBs), and interference determined in specific PRBs enables identification of different channels and, correspondingly, donor access nodes deploying the different channels. Thus, selecting the donor access node comprises identifying the portions of the wireless air interface in which interference is determined, and correlating the portions of the wireless air interface with a frequency band or channel associated with each candidate donor access node. Candidate donor access nodes not deploying the frequencies where interference is measured (or where the interference falls below a threshold) are chosen as donors at 1030. For example, a donor access node can be selected from among the candidate donor access nodes based on the measured interference of a channel (or specific PRBs associated therewith) being below a threshold. In an exemplary embodiment, the interference is measured for channels associated with a specific RAT, e.g. 4G LTE, or 5G NR, depending on whether the candidate donor access node is a primary donor access node or a secondary donor access node. Different thresholds of interference may be defined for different types of RATs and donor access nodes. In the event that a serving donor access node is a primary donor access node (e.g. a eNodeB), and a secondary donor access node is being identified for EN-DC purposes, the interference in PRBs (or channels) associated with one or more secondary access nodes (e.g. gNodeBs) may be monitored. In an exemplary embodiment, the primary donor access node (e.g. eNodeB) can be responsible for the decision of which secondary donor access node (e.g. gNodeB) to select for EN-DC transmissions based on the interference associated with each secondary donor access node.

Figure 11:
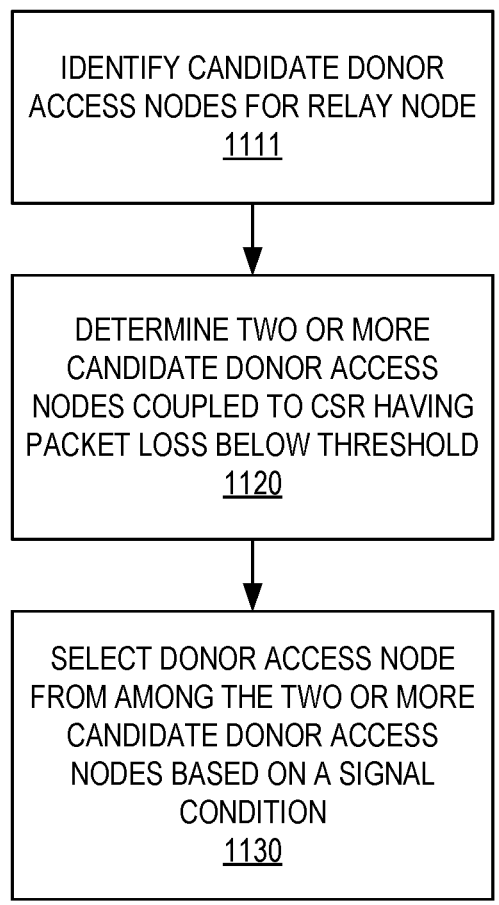
FIG. 11 depicts an exemplary method for selecting donor access nodes for relay nodes capable of 5G EN-DC.

FIG. 11 depicts an exemplary method for selecting donor access nodes for relay nodes capable of 5G EN-DC. The method of FIG. 11 may be implemented by a processing node communicatively coupled to one or more access nodes, controller nodes, or any other network node. Although FIG. 11 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 1111, candidate donor access nodes are identified for a relay node, and at 1120, two or more candidate donor access nodes are determined as being coupled to a cell site router with packet losses below a threshold, based on the operations described herein. Thus, to narrow down the selection of a donor access node, at 1130, the donor access nodes are selected based on a signal condition, from among the donor access nodes associated with packet losses below the threshold.

Figure 12:
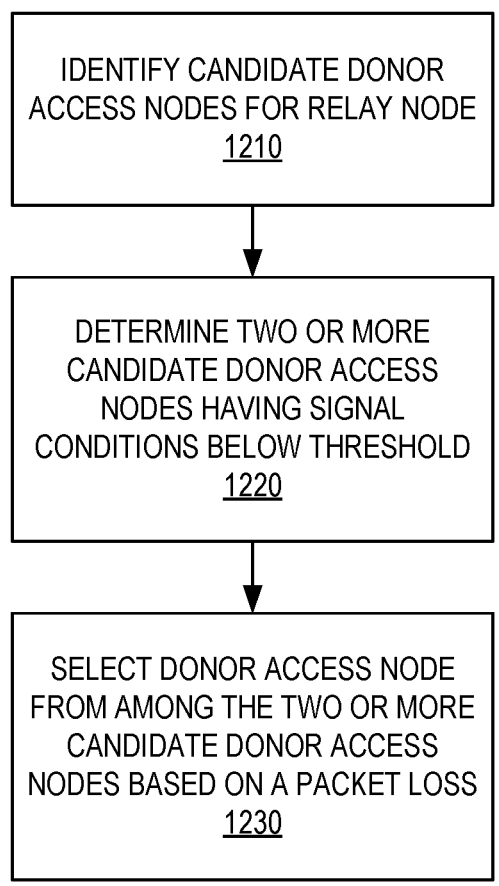
FIG. 12 depicts an exemplary method for selecting donor access nodes for relay nodes capable of 5G EN-DC.

FIG. 12 depicts an exemplary method for selecting donor access nodes for relay nodes capable of 5G EN-DC. The method of FIG. 12 may be implemented by a processing node communicatively coupled to one or more access nodes, controller nodes, or any other network node. Although FIG. 12 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 1210, candidate donor access nodes are identified for a relay node, and at 1220, two or more candidate donor access nodes are determined as having per-PRB interference below a threshold, based on the operations described herein. Thus, to narrow down the selection of a donor access node, at 1230, the donor access nodes are selected based on a packet loss of their associated cell site router being below a threshold, from among the donor access nodes with the low-interference PRBs.

Further, selecting a donor access node can include adjusting handover thresholds. A signal quality reported by the relay node is monitored, wherein the handover thresholds are adjusted such that the signal quality does not deteriorate past a threshold. For example, if a donor access node is associated with a below-threshold signal quality or an above-threshold packet drop rate, then a handover threshold associated with the donor access node is raised, such that a handover of the relay node to the donor access node is prevented or discouraged. Adjusting the handover threshold may include increasing or raising a threshold signal level associated with the donor access node. The adjustment may further comprise decreasing or lowering a threshold signal level of a serving donor access node, such that the relay node remains attached to the serving donor access node for a longer time. Alternatively or in addition, if a donor access node is associated with an above-threshold signal quality or a below-threshold packet drop rate, then a handover threshold of the donor access node is lowered, such that a handover of the relay node to the donor access node is performed or encouraged. Adjusting the handover threshold may include decreasing or lowering a threshold signal level associated with the donor access node. The adjustment may further comprise increasing or raising a threshold signal level of the serving donor access node, such that the relay node is triggered to detach from the serving donor access node sooner. These adjusted handover thresholds can be transmitted to relay nodes that are capable of 5G EN-DC identified in the wireless network and within range of the candidate donor access nodes.

In LTE and 5G systems, such a pair of triggers is known as an A4 measurement. Other combinations of handover triggers may be within the purview of those having ordinary skill in the art in light of this disclosure. In an exemplary embodiment, the triggers may comprise thresholds, offsets, or hysteresis values for an A4 measurement event, A5 measurement event, B1 measurement event, or B2 measurement event (e.g., when implementing an LTE network). For example, in an A5 event, a received first signal level plus a hysteresis may be compared to a first threshold and a received second signal level plus offsets minus a hysteresis may be compared to a second threshold. The first received signal level may comprise a received signal level from the first access node and the second received signal level may comprise a received signal level from a target access node, where the first and seconds signals are received at the wireless device. Some example signal levels may comprise a Received Signal Strength Indicator, (RSSI), Reference Signal Received Quality (RSRQ), RSRP, or any other suitable signal level.

Further, while 4G LTE and 5G NR are described in the above embodiments, the disclosed operations may apply to different combinations of radio air interfaces, including any combination of radio air interfaces within the same or different radio-access technologies, such as multiple different 4G carriers, 5G carriers, or any future wireless technology. So long as the described selections of donor access nodes for relay nodes is performed as described herein, the specific implementation and network topology is less relevant.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting a donor access node for a relay node, the method comprising:
    identifying a relay node within range of one or more candidate donor access nodes;
    determining interference in portions of wireless air interfaces deployed by each of the one or more candidate donor access nodes; and
    selecting a donor access node for the relay node from the one or more candidate donor access nodes based on packet loss at a cell site router associated with each candidate donor access node and on-an interference in the wireless air interfaces deployed by each candidate donor access node by identifying the portions of the wireless air interface in which interference is determined and correlating the portions of the wireless air interface with a frequency band or channel associated with each candidate donor access node.

2. The method of claim 1, wherein each candidate donor access node is capable of participating in dual-connectivity using at least one of a first radio access technology (RAT) and a second RAT.

3. The method of claim 2, wherein each candidate donor access node comprises a primary access node configured to deploy carriers utilizing the first RAT, the primary access node is coupled to one or more secondary access nodes, each secondary access node configured to deploy carriers utilizing the second RAT.

4. The method of claim 3, further comprising:
    measuring a packet loss at a port of the cell site router that is associated with the first RAT; and
    selecting a donor access node for the relay node from the one or more candidate donor access nodes based at least in part on the packet loss.

5. The method of claim 3, further comprising:
    measuring a packet loss at a port of the cell site router that is associated with the second RAT; and
    selecting a donor access node for the relay node from the one or more candidate donor access nodes based at least in part on the packet loss.

6. The method of claim 2, wherein each candidate donor access node comprises a secondary access node configured to deploy carriers utilizing the second RAT, the secondary access node being coupled to a primary access node configured to deploy carriers utilizing the first RAT.

7. The method of claim 6, further comprising:
    measuring a packet loss at a port of the cell site router that is associated with the second RAT; and
    selecting a donor access node for the relay node from the one or more candidate donor access nodes based at least in part on the packet loss.

8. The method of claim 1, further comprising identifying the relay node based on a unique identifier associated with the relay node, the unique identified comprising at least one of a public land mobile number (PLMN), a primary cell identifier (PCI), or a quality of service control identifier (QCI).

9. A method for selecting a donor access node for a relay node, the method comprising:
    identifying one or more candidate donor access nodes for a relay node;
    determining interference in portions of a wireless air interface deployed by each candidate donor access node;
    obtaining a packet loss associated with each candidate donor access node; and
    selecting a donor access node for the relay node based on the packet loss and on the interference by identifying portions of the wireless air interface in which interference is determined, and correlating portions of the wireless air interface with a frequency band or channel associated with each candidate donor access node.

10. The method of claim 9, further comprising identifying the relay node based on a unique identifier associated with the relay node, the unique identified comprising at least one of a public land mobile number (PLMN), a primary cell identifier (PCI), or a quality of service control identifier (QCI).

11. The method of claim 9, wherein identifying the one or more candidate donor access nodes comprises determining that the one or more candidate donor access nodes are capable of participating in dual-connectivity using at least one of a first radio access technology (RAT) and a second RAT.

12. The method of claim 11, wherein each candidate donor access node comprises a primary access node configured to deploy carriers utilizing the first RAT, the primary access node is coupled to one or more secondary access nodes, each secondary access node configured to deploy carriers utilizing the second RAT.

13. The method of claim 11, wherein each candidate donor access node comprises a secondary access node configured to deploy carriers utilizing the second RAT, the secondary access node being coupled to a primary access node configured to deploy carriers utilizing the first RAT.

14. A system for selecting a donor access node for a relay node, the system comprising:
- a primary donor access node configured to deploy a wireless air interface using a first RAT;
- one or more secondary donor access nodes configured to deploy wireless air interfaces using at least a second RAT; and
- a processor coupled to the primary donor access node, the processor being configured to perform operations comprising:
  - identifying a relay node capable of attaching to at least the first and second RATS;
  - determining interference in portions of the wireless air interface deployed by each candidate donor access node; and
  - selecting a donor access node for the relay node from among the one or more secondary donor access nodes by comparing interference of the one or more secondary donor access nodes by identifying the portions of the wireless air interface in which interference is determined and correlating the portions of the wireless air interface with a frequency band or channel associated with each candidate donor access node, and by comparing a packet loss of the one or more secondary donor access nodes.

15. The system of claim 14, wherein the packet loss is measured at a cell site router coupled to each secondary donor access node.

16. The system of claim 14, wherein the operations further comprise:
- instructing the relay node to attach to the primary donor access node via the first RAT; and
- instructing the relay node to attach to the secondary donor access node via the second RAT.

* * * * *